US012778147B2

(12) United States Patent
Tsai et al.

(10) Patent No.: US 12,778,147 B2
(45) Date of Patent: Nov. 3, 2026

(54) FOOD PRESERVATION APPARATUS AND SYSTEM THEREOF

(71) Applicant: National Pingtung University of Science and Technology, Pingtung (TW)

(72) Inventors: Pi-Jen Tsai, Pingtung (TW); Wei-Jhong Ju, Pingtung (TW); Lung-Ming Fu, Pingtung (TW); Yao-Nan Wang, Pingtung (TW)

(73) Assignee: NATIONAL PINGTUNG UNIVERSITY OF SCIENCE AND TECHNOLOGY, Pingtung (TW)

( * ) Notice: Subject to any disclaimer, the term of this patent is extended or adjusted under 35 U.S.C. 154(b) by 1028 days.

(21) Appl. No.: 17/985,154

(22) Filed: Nov. 11, 2022

(65) Prior Publication Data

US 2023/0232847 A1 Jul. 27, 2023

(30) Foreign Application Priority Data

Jan. 24, 2022 (TW) ................................. 111102907

(51) Int. Cl.
*A23B 2/60* (2025.01)
*A23B 7/015* (2006.01)

(52) U.S. Cl.
CPC ................ *A23B 2/60* (2025.01); *A23B 7/015* (2013.01)

(58) Field of Classification Search
CPC ................................. A23B 2/60; A23B 7/015
See application file for complete search history.

(56) References Cited

U.S. PATENT DOCUMENTS

2002/0088800 A1* 7/2002 Miller ...................... A21B 3/02 219/700
2015/0351446 A1* 12/2015 Kawamura .............. A23B 2/60 204/242

FOREIGN PATENT DOCUMENTS

| | | | | | |
|---|---|---|---|---|---|
| CN | 1171036 | A | * | 1/1998 | A23B 4/18 |
| CN | 101085652 | A | * | 12/2007 | |
| CN | 111700108 | A | * | 9/2020 | B65G 15/58 |
| CN | 219205775 | U | * | 6/2023 | |
| CN | 116941723 | A | * | 10/2023 | A23B 2/708 |
| CN | 121372713 | A | * | 1/2026 | |

(Continued)

OTHER PUBLICATIONS

Translation of DE 102017210327 (Year: 2017).*
CN 111700108 translation (Year: 2020).*

*Primary Examiner* — Woody A Lee, Jr.
(74) *Attorney, Agent, or Firm* — Leong C. Lei

(57) ABSTRACT

A food preservation apparatus includes: a case body, forming an accommodating space inside, and including an inlet and an outlet in communication with the accommodating space; a transfer apparatus, including a conveyor belt and a drive assembly; at least one electric field generation apparatus, configured to generate a local electric field, the electric field generation apparatus being located in the accommodating space, and including an insulating substrate and a plurality of electrode plates, where the insulating substrate is disposed on an inner side wall surface of the case body on a different side from the part of the conveyor belt, and the plurality of electrode plates is arranged at intervals on the insulating substrate in the direction from the inlet to the outlet; and a control apparatus, electrically connected to the drive assembly and the plurality of electrode plates.

7 Claims, 4 Drawing Sheets

(56) References Cited

FOREIGN PATENT DOCUMENTS

| | | | | | |
|---|---|---|---|---|---|
| DE | 102017210327 | A1 | * | 12/2018 | ............. A23B 7/015 |
| DE | 102017121731 | A1 | * | 3/2019 | ........ H01J 37/32752 |
| EP | 0553377 | A1 | * | 8/1993 | ............... A23B 2/60 |
| GB | 2604899 | A | * | 9/2022 | ............. A01G 31/06 |

* cited by examiner

FOOD PRESERVATION APPARATUS AND SYSTEM THEREOF

CROSS-REFERENCE TO RELATED APPLICATION

This application claims the benefit of Taiwan Patent Application No. 111102907, filed on 24 Jan. 2022, which is hereby incorporated by reference for all purposes as if fully set forth herein.

BACKGROUND

Technical Field

The present invention mainly relates to a preservation apparatus, and in particular, to a food preservation apparatus and system thereof that preserve foods by using electrostatic field processing.

Related Art

Fruits can be divided into climacteric fruits and non-climacteric fruits according to a ripening process. Climacteric fruits undergo a respiratory climacteric in a ripening process. That is, the respiration rates and ethylene production of climacteric fruits suddenly rise to peaks and then return to original values. Climacteric fruits synthesize ethylene through autocatalytic reactions. Therefore, climacteric fruits can continue to ripen following their harvest. As a result, climacteric fruits tend to rot to become inedible.

In conventional food preservation methods, for example, the refrigeration and freezing functions of refrigerators, high-temperature sterilization, low-temperature sterilization or ultraviolet light sterilization is used to enhance the shelf life of foods. However, in the foregoing conventional food preservation methods, beneficial probiotics in foods may be killed or ingredients of nutritional value in foods may be denatured, resulting in a loss of original nutritional value of the foods.

In view of this, it is necessary to provide a food preservation apparatus and system thereof to resolve the foregoing problems.

SUMMARY

An objective of the present invention is to provide a food preservation apparatus that can preserve foods by using electrostatic field processing.

A secondary objective of the present invention is to provide a food preservation system that may be applied to the foregoing food preservation apparatus.

To achieve the foregoing objective, the present invention provides a food preservation apparatus, including: a case body, forming an accommodating space inside, the case body including an inlet and an outlet in communication with the accommodating space; a transfer apparatus, including a conveyor belt and a drive assembly, where part of the conveyor belt is located in the accommodating space, and the drive assembly is connected to the conveyor belt, and drives the conveyor belt to move in a direction from the inlet to the outlet; at least one electric field generation apparatus, configured to generate a local electric field, the electric field generation apparatus being located in the accommodating space, and including an insulating substrate and a plurality of electrode plates, where the insulating substrate is disposed on an inner side wall surface of the case body on a different side from the part of the conveyor belt, and the plurality of electrode plates is arranged at intervals on the insulating substrate in the direction from the inlet to the outlet; and a control apparatus, electrically connected to the drive assembly and the plurality of electrode plates, the control apparatus being configured to control the drive assembly and the plurality of electrode plates to actuate.

In some embodiments, a plurality of electric field generation apparatuses is provided, the case body includes at least one electric partition, the at least one electric partition is electrically connected to the control apparatus, and divides the accommodating space into a plurality of subspaces, and one of the electric field generation apparatuses is respectively disposed in the plurality of subspaces. In this way, electric field preservation processing can be performed on a plurality of foods of the same type or different types simultaneously.

In some embodiments, the case body further includes a plurality of pick-up ports and a plurality of corresponding box covers, the plurality of pick-up ports is respectively opened in a side wall of the case body between the plurality of electric field generation apparatuses and the part of the conveyor belt, and each box cover is capable of opening or closing a corresponding pick-up port.

In some embodiments, the food preservation apparatus of the present invention may further include a detection apparatus electrically connected to the control apparatus, the detection apparatus being disposed at a position relatively close to the inlet, and being located beside the conveyor belt outside the accommodating space. In this way, the types of a plurality of foods that sequentially enters the case body can be automatically recognized, thereby implementing automatic system processing.

In some embodiments, the detection apparatus is an image recognition module.

In some embodiments, the detection apparatus is an electronic label reader or a mobile barcode scanner.

In some embodiments, a valve is respectively disposed in each of the inlet and the outlet of the case body, to respectively open or close the inlet and the outlet.

The present invention further provides a food preservation system, including the foregoing food preservation apparatus, where the control apparatus includes a database module, the database module is configured to store an identification name of each of a plurality of foods and a corresponding processing parameter, the processing parameter includes a voltage, a current, and a duration, the control apparatus controls the drive assembly and the detection apparatus to operate, to enable the detection apparatus to sequentially recognize a plurality of foods placed on the conveyor belt and enable the plurality of foods to sequentially enter the accommodating space to be respectively located in the plurality of subspaces, to acquire an identification code and a subspace position of each food, the control apparatus compares an identification code of each food with an identification name recorded in the database module, to acquire a processing parameter of each food, and the control apparatus controls the at least one electric partition to descend, and controls a corresponding electric field generation apparatus according to a subspace position of each food to generate a local electric field by using a corresponding processing parameter, to respectively perform electric field preservation processing on the plurality of foods.

The food preservation apparatus and system thereof of the present invention have the following characteristic: The voltage, current, and duration of a local electric field generated by the electric field generation apparatus can be adjusted for different foods, to perform electric field preservation processing on the foods. In this way, the present invention can implement food preservation.

DETAILED DESCRIPTION

Figure 1:
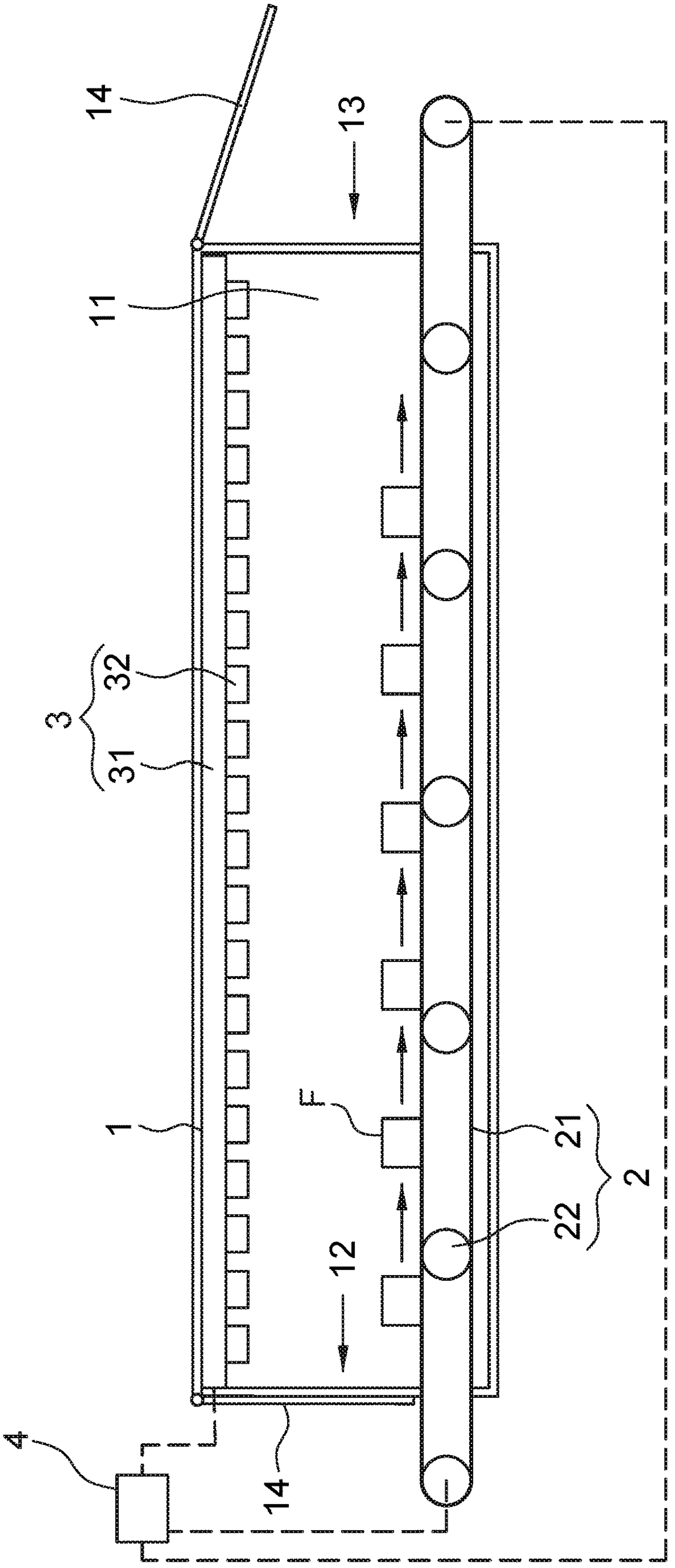
FIG. 1 is an assembly diagram of a food preservation apparatus according to a first embodiment of the present invention.

Embodiments of the present invention are described in detail below with reference to the accompanying drawings. The accompanying drawings are mainly simplified schematic diagrams, and only exemplify the basic structure of the present invention schematically. Therefore, only the components related to the present invention are shown in the drawings, and are not drawn according to the quantity, shape, and size of the components during actual implementation. During actual implementation, the specification and size of the components are actually an optional design, and the layout of the components may be more complicated.

The following description of various embodiments is provided to exemplify the specific embodiments for implementation of the present invention with reference to accompanying drawings. The directional terms mentioned in the present invention, like "above", "below", "front", and "back", refer to the directions in the accompanying drawings. Therefore, the used direction terms are intended to describe and understand the present invention, but are not intended to limit the present invention. In addition, in the specification, unless explicitly described as contrary, the term "include" is understood as including the component, but does not exclude any other components.

FIG. 1 shows a first embodiment of a food preservation apparatus according to the present invention, including a case body 1, a transfer apparatus 2, at least one electric field generation apparatus 3, and a control apparatus 4. Part of the transfer apparatus 2 and the at least one electric field generation apparatus 3 are located in the case body 1. The control apparatus 4 is electrically connected to the transfer apparatus 2 and the at least one electric field generation apparatus 3.

The case body 1 forms an accommodating space inside 11. The case body 1 includes an inlet 12 and an outlet 13 in communication with the accommodating space 11. Preferably, a valve 14 is respectively disposed in each of the inlet 12 and the outlet 13, to respectively open or close the inlet 12 and the outlet 13. In this embodiment, the case body 1 is made of metal. The valve 14 is an electric valve.

In the present invention, the transfer apparatus 2 is configured to convey a plurality of foods F that requires electric field preservation processing into the accommodating space 11 of the case body 1. In this embodiment, each food F is a climacteric fruit. The transfer apparatus 2 includes a conveyor belt 21 and a drive assembly 22. Part of the conveyor belt 21 is located in the accommodating space 11. The drive assembly 22 is connected to the conveyor belt 21, and drives the conveyor belt 21 to move in a direction from the inlet 12 to the outlet 13. In particular, the drive assembly 22 may be a roller set. The roller set is formed by arranging a plurality of rotatable rollers in the direction from the inlet 12 to the outlet 13. Two rollers at a head end and a tail end may be electric rollers driven by a motor, to drive the conveyor belt 21 to move in the direction from the inlet 12 to the outlet 13. A plurality of auxiliary rollers disposed at intervals from each other may be further provided between the two rollers, to support and assist in the movement of the conveyor belt 21.

In the present invention, the at least one electric field generation apparatus 3 is configured to generate a local electric field. In this embodiment, the local electric field is an electrostatic field. The electric field generation apparatus 3 is located in the accommodating space 11, and includes an insulating substrate 31 and a plurality of electrode plates 32. The insulating substrate 31 is disposed on an inner side wall surface of the case body 1 on a different side from the part of the conveyor belt 21. In this embodiment, the insulating substrate 31 is disposed on an inner side top wall of the case body 1. The plurality of electrode plates 32 is arranged at intervals on the insulating substrate 31 in the direction from the inlet 12 to the outlet 13, and is not in contact with the case body 1.

The control apparatus 4 is electrically connected to the drive assembly 22 and the plurality of electrode plates 32. The control apparatus 4 is configured to control the drive assembly 22 and the plurality of electrode plates 32 to actuate, to perform electric field preservation processing on the plurality of foods F. In this embodiment, the plurality of foods F is foods of the same type. Moreover, after electric field preservation processing is performed on the plurality of foods F, the control apparatus 4 controls the drive assembly 22 to actuate, to enable the plurality of foods F to move toward the outlet 13, and synchronously feed a next batch of foods F into the accommodating space 11 of the case body 1.

Figure 2:
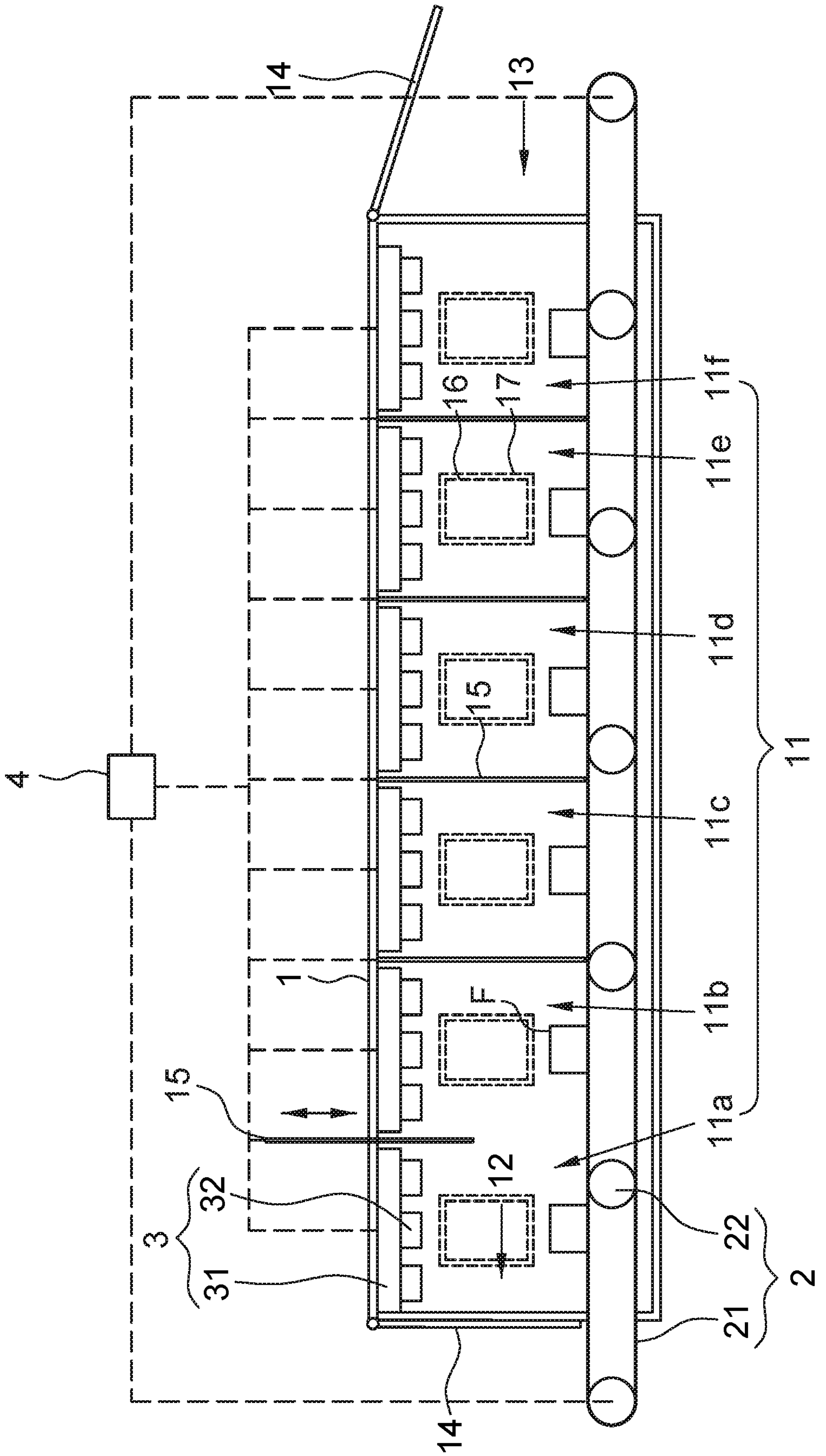
FIG. 2 is an assembly diagram of a food preservation apparatus according to a second embodiment of the present invention.

FIG. 2 shows a second embodiment of a food preservation apparatus according to the present invention. In this embodiment, a plurality of electric field generation apparatuses 3 is provided. The plurality of electric field generation apparatuses 3 is respectively electrically connected to the control apparatus 4. The case body 1 includes at least one electric partition 15. The at least one electric partition 15 is electrically connected to the control apparatus 4, and divides the accommodating space 11 into a plurality of subspaces 11*a* to 11*f*. One of the electric field generation apparatuses 3 is respectively disposed in the plurality of subspaces 11*a* to 11*f*. It should be noted that when electric field preservation processing needs to be performed on the plurality of foods F located in the case body 1, the control apparatus 4 needs to control the at least one electric partition 15 to descend, to divide the accommodating space 11 into the plurality of subspaces 11*a* to 11*f*, and after electric field preservation processing of the plurality of foods F is completed, controls the at least one electric partition 15 to ascend, to enable a next batch of foods F to be driven by the conveyor belt 21 to move toward the outlet 13.

In this embodiment, the case body 1 may further include a plurality of pick-up ports 16 and a plurality of corresponding box covers 17. The plurality of pick-up ports 16 is respectively opened in a side wall of the case body 1 between the plurality of electric field generation apparatuses 3 and the part of the conveyor belt 21. Each box cover 17 is capable of opening or closing a corresponding pick-up port 16. The control apparatus 4 is configured to control the at least one electric partition 15, the drive assembly 22, and the plurality of electrode plate 32 to actuate, to perform electric field preservation processing on the plurality of foods F. In this embodiment, the plurality of foods F may be foods of the same type or different types. Moreover, after electric field preservation processing is performed on the plurality of foods F, the plurality of box covers 17 may be opened to pick up the plurality of foods F from the plurality of pick-up ports 16.

Figure 3:
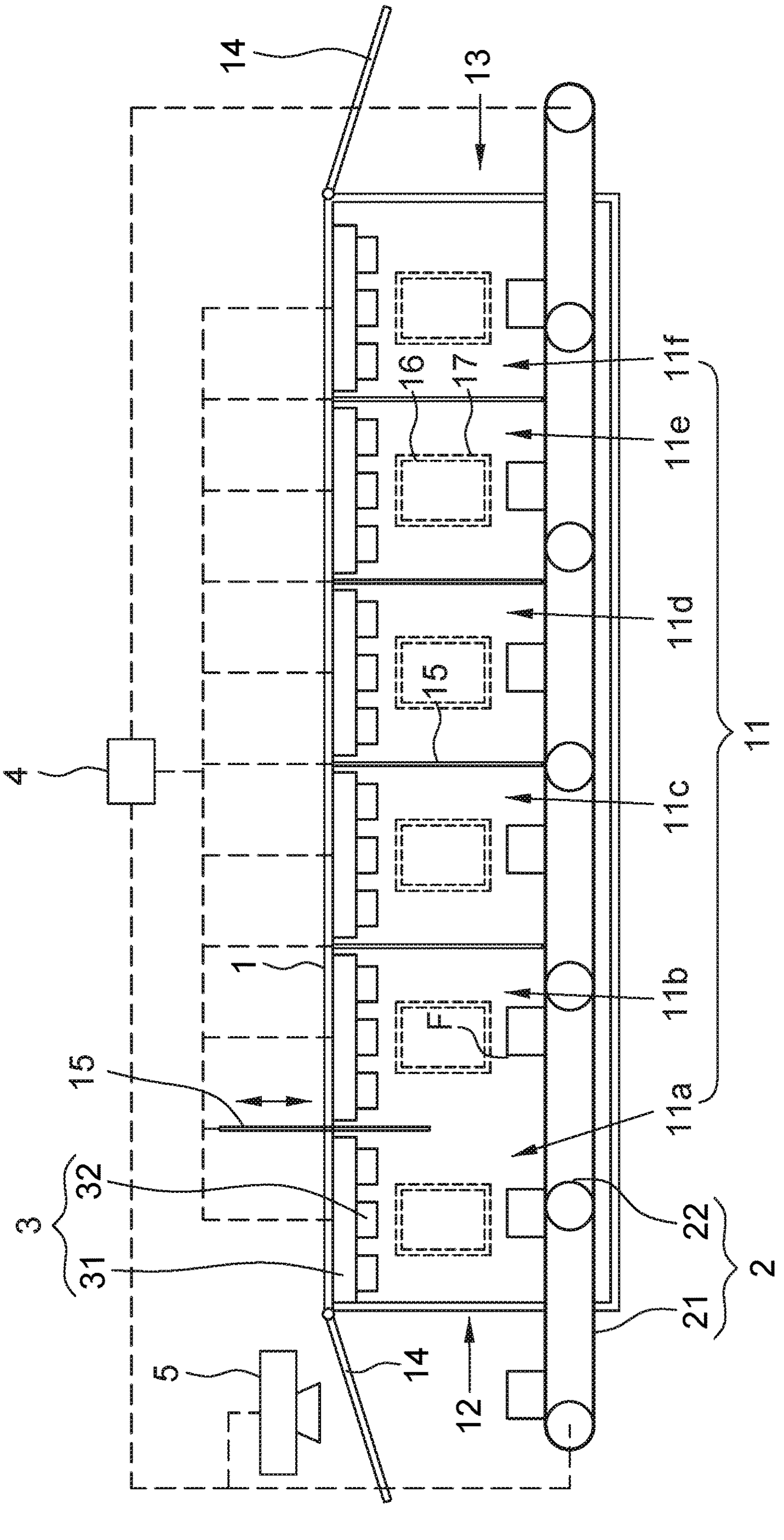
FIG. 3 is an assembly diagram of a food preservation apparatus according to a third embodiment of the present invention.

FIG. 3 shows a third embodiment of a food preservation apparatus according to the present invention. Compared with the foregoing first and second embodiments, in this embodiment, the food preservation apparatus further includes a detection apparatus 5 electrically connected to the control apparatus 4. The detection apparatus 5 is disposed at a position relatively close to the inlet 12, and is located beside the conveyor belt 21 outside the accommodating space 11. The detection apparatus 5 is configured to recognize a food F that is placed on the conveyor belt 21 but has not entered the accommodating space 11. For example, the detection apparatus 5 may be an image recognition module, an electronic label reader or a mobile barcode scanner. The control apparatus 4 is configured to control the at least one electric partition 15, the drive assembly 22, and the plurality of electrode plate 32 to actuate, to perform electric field preservation processing on the plurality of foods F. In this embodiment, the plurality of foods F may be foods of the same type or different types.

Specifically, when the detection apparatus 5 is an image recognition module, a food F located on the conveyor belt 21 may be photographed to generate a food image, and the food image is recognized to recognize the type of the food F. The image recognition module may recognize the food image by using a deep learning technology such as a convolutional neural network (CNN). The technology can be understood by those with general knowledge in related fields of the present invention, and details are not described herein again. In another aspect, when the detection apparatus 5 is respectively an electronic label reader or a mobile barcode scanner, the outer package of the food F respectively includes corresponding labels. The electronic label reader may be, for example, but not limited to, an RFID reader. The mobile barcode scanner may be a QR-CODE scanner.

Figure 4:
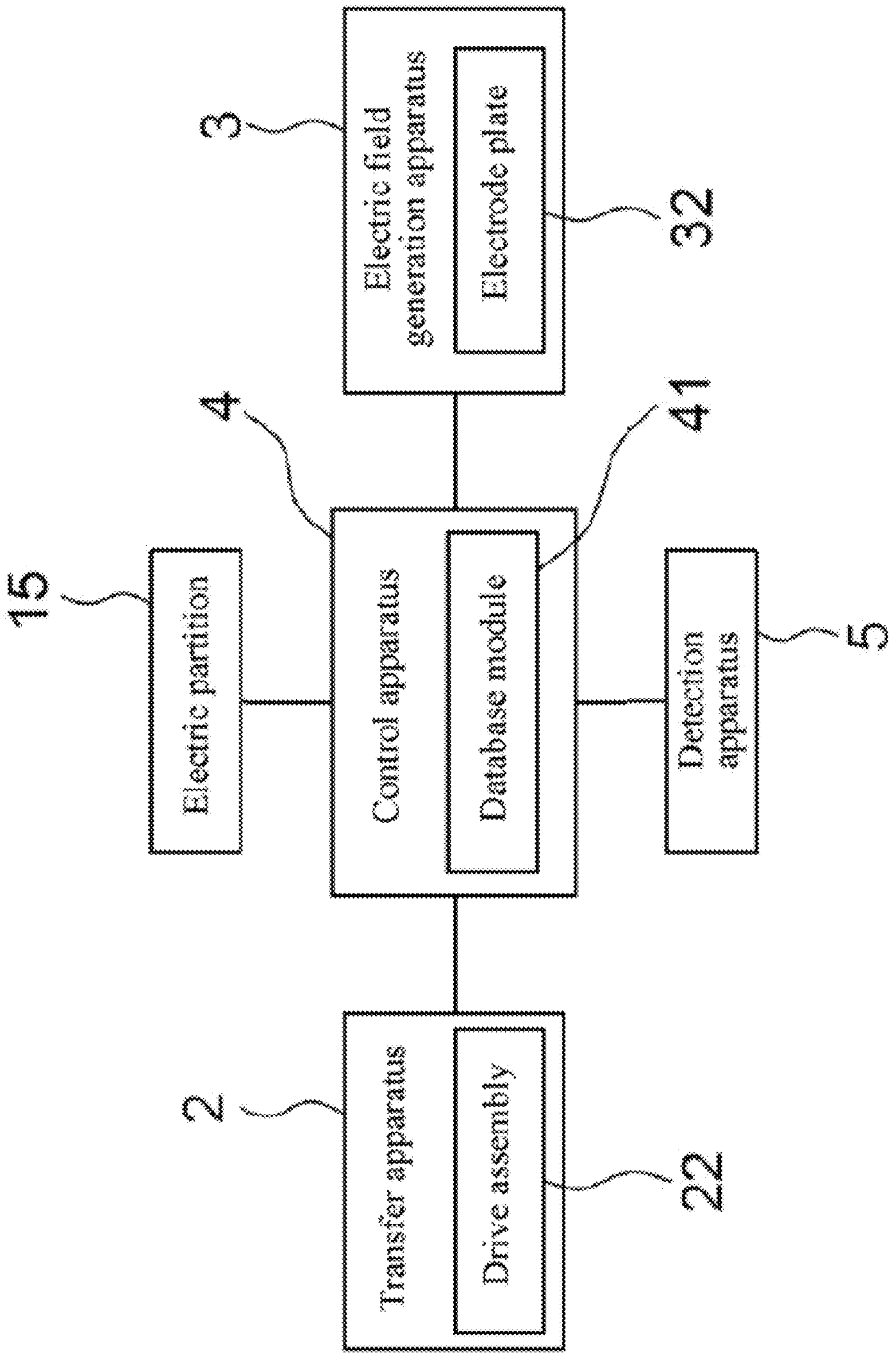
FIG. 4 is a system block diagram of a food preservation system according to the present invention.

FIG. 4 shows a preferred embodiment of a food preservation system according to the present invention, including the foregoing food preservation apparatus. The control apparatus 4 includes a database module 41. The database module 41 is configured to store an identification name of each of a plurality of foods F and a corresponding processing parameter. In this embodiment, the identification name is a food name or a food code. The processing parameter includes a voltage (kV), a current (mA), and a duration (min). The current is direct current (DC).

The control apparatus 4 controls the drive assembly 22 and the detection apparatus 5 to operate, to enable the detection apparatus 5 to sequentially recognize a plurality of foods F placed on the conveyor belt 21 and enable the plurality of foods F to sequentially enter the accommodating space 11 to be respectively located in the plurality of subspaces 11*a* to 11*f*, to acquire an identification code and a subspace position of each food.

The control apparatus 4 compares an identification code of each food F with an identification name recorded in the database module 41, to acquire a processing parameter of each food F. The control apparatus 4 controls the at least one electric partition 15 to descend, and controls a corresponding electric field generation apparatus 3 according to a subspace position of each food F to generate a local electric field by using a corresponding processing parameter, to respectively perform electric field preservation processing on the plurality of foods.

For example, the database module 41 records foods F such as tomato, cucumber, banana, apple, watermelon, and *papaya*, and processing parameters including the voltage, current, and duration of each food F may be respectively shown in the following Table 1:

TABLE 1

Table of processing parameters of foods

| Food | Voltage | Current | Duration |
|---|---|---|---|
| Cabbage | 40 | 0.75 | 20 |
| Broccoli | 35 | 0.3 | 10 |
| Baby corn | 30 | 0.8 | 15 |
| Potato | 30 | 0.9 | 15 |
| Cabbage shreds | 30 | 0.2 | 7 |
| Sweet potato | 20 | 0.25 | 10 |

The foregoing plurality of foods F sequentially enters the accommodating space 11. That is, sweet potato, cabbage shreds, potato, baby corn, broccoli, and cabbage are respectively located in the plurality of subspaces 11*a* to 11*f*. The control apparatus 4 controls an electric field generation apparatus 3 corresponding to each subspace, and generates a local electric field by using a processing parameter corresponding to each food F, to respectively perform electric field preservation processing on the plurality of foods F.

In summary, for the food preservation apparatus and system thereof, the voltage, current, and duration of a local electric field generated by the electric field generation apparatus can be adjusted for different foods, to perform electric field preservation processing on the foods. In this way, the present invention can implement food preservation.

The above embodiments merely exemplify the principles, features, and effects of the present invention, but are not intended to limit the implementation scope of the present invention. A person skilled in the art can modify or change the above embodiments without departing from the spirit and scope of the present invention. Any equivalent change or modification made using the contents disclosed by the present invention shall fall within the scope of the claims below.

What is claimed is:

1. A food preservation apparatus, comprising:

a case body, forming an accommodating space inside, the case body comprising an inlet and an outlet in communication with the accommodating space;

a transfer apparatus, comprising a conveyor belt and a drive assembly, wherein part of the conveyor belt is located in the accommodating space, and the drive assembly is connected to the conveyor belt, and drives the conveyor belt to move in a direction from the inlet to the outlet;

at least one electric field generation apparatus, configured to generate a local electric field, the electric field generation apparatus being located in the accommodating space, and comprising an insulating substrate and a plurality of electrode plates, wherein the insulating substrate is disposed on an inner side wall surface of the case body on a different side from the part of the conveyor belt, and the plurality of electrode plates is arranged at intervals on the insulating substrate in the direction from the inlet to the outlet; and a control apparatus, electrically connected to the drive assembly and the plurality of electrode plates, the control apparatus being configured to control the drive assembly and the plurality of electrode plates to actuate;

wherein the case body further comprises a plurality of pick-up ports and a plurality of corresponding box covers, the plurality of pick-up ports is respectively opened in a side wall of the case body between the plurality of electric field generation apparatuses and the part of the conveyor belt, and each box cover is capable of opening or closing a corresponding pick-up port.

2. The food preservation apparatus according to claim 1, wherein a plurality of electric field generation apparatuses is provided, the case body comprises at least one electric partition, the at least one electric partition is electrically connected to the control apparatus, and divides the accommodating space into a plurality of subspaces, and one of the electric field generation apparatuses is respectively disposed in the plurality of subspaces.

3. The food preservation apparatus according to claim 1, further comprising a detection apparatus electrically connected to the control apparatus, the detection apparatus being disposed at a position closer to the inlet than the outlet, and being located beside the conveyor belt outside the accommodating space.

4. The food preservation apparatus according to claim 3, wherein the detection apparatus is an image recognition module.

5. The food preservation apparatus according to claim 3, wherein the detection apparatus is an electronic label reader or a mobile barcode scanner.

6. The food preservation apparatus according to claim 1, wherein a valve is respectively disposed in each of the inlet and the outlet of the case body, to respectively open or close the inlet and the outlet.

7. A food preservation system, comprising:

the food preservation apparatus according to claim 4, wherein the control apparatus comprises a database module, the database module is configured to store an identification name of each of a plurality of foods and a corresponding processing parameter, the processing parameter comprises a voltage, a current, and a duration, the control apparatus controls the drive assembly and the detection apparatus to operate, to enable the detection apparatus to sequentially recognize a plurality of foods placed on the conveyor belt and enable the plurality of foods to sequentially enter the accommodating space to be respectively located in the plurality of subspaces, to acquire an identification code and a subspace position of each food, the control apparatus compares an identification code of each food with an identification name recorded in the database module, to acquire a processing parameter of each food, and the control apparatus controls the at least one electric partition to descend, and controls a corresponding electric field generation apparatus according to a subspace position of each food to generate a local electric field by using a corresponding processing parameter, to respectively perform electric field preservation processing on the plurality of foods.

* * * * *